Patented Jan. 19, 1943

2,308,601

UNITED STATES PATENT OFFICE 2,308,601

METHOD FOR THE PRODUCTION OF COOKED FOODS IN A DRIED STATE

Johan Georg Wilhelm Gentele, Stockholm, Sweden, assignor to International Vato Aktiebolag, Stockholm, Sweden, a corporation of Sweden No Drawing. Application May 2, 1939, Serial No. 271,341. In Sweden June 11, 1938

1 Claim. (Cl. 99—204)

A method has long been sought by which it would be possible to produce easily transportable and durable cooked foods or dishes, light in weight and easily prepared for consumption. As examples of such a need may be mentioned expeditions or journeys, for example for scientific or military purposes, for lumberers, fishermen, on ships etc. and, in fact, wherever there are difficulties in getting food. In such cases the only available method has generally been the use of tinned (canned) foods, the transport and storage of which present, however, considerable difficulties. Canned foods have to be preserved in air-tight containers, usually of metal, as a result of which they are both heavy and bulky so that it is difficult or impossible to take along large quantities of them on long expeditions or journeys. In addition, when canned goods have been kept for a long time, they often acquire a bad taste. Further, if a tin of such food is opened and the whole is not eaten at once, the rest can not be kept but is spoiled.

The object of the present invention is the preparation of dried foods or dishes by a process of evaporation so that they can be stored for a long time without being spoiled, in addition to which they are not bulky and can easily be transported. Thus, food-stuffs produced according to the present invention are particularly suitable for the above-mentioned purposes, so much the more since they are easily prepared for consumption and all the requisite ingredients of a meal are present in the dried product.

The characteristic feature of the invention is that, firstly, a meal is prepared in the usual manner by cooking for instance in water. Thereafter it is dried by evaporation in vacuo, the substance to be dried being meanwhile exposed to the action of heat-rays with a comparatively short wave-length which penetrate deeply into the substance to be dried and drive out the moisture. If the said heat-rays are emitted by sources of heat situated on both sides of but at a distance from metallic or other trays or supports and are heated to a comparatively high temperature, for example, 200–600° C. or more, the process of evaporation can be carried out in a comparatively short time so that by far the greatest part of the water is driven off. As a result of the removal of the water, the bulk and weight of the products thus obtained are very small as compared with those of the food before drying. When they are to be used, all that is necessary is to stir up the dried food with water, whereupon, after heating to a suitable temperature, a complete and well-tasting dish is obtained which, by reason of the method of evaporation used, contains all the more valuable constituents of the originally cooked dish, such as vitamines etc.

As an example, if it is desired to prepare ordinary pea-soup with pickled pork, the peas and the pork are boiled together in the usual manner until ready. Thereafter the soup is dried in vacuo in order to remove the water. Although this process of drying may be carried out in several ways, it is suitable to proceed as follows. The soup is placed in trough-shaped containers of metal, suitably aluminium, which should preferably be blackened, at least underneath, so that the reflected heat-rays are kept at a minimum. The heating of the substance to be dried is effected by means of heat-rays with a comparatively short wavelength which are emitted by sources of heat placed above and below the containers and are heated to temperatures above 200° C., for example, 200-600° C. or more. In order to avoid the heating of the containers by conducted heat, which might involve their being heated to too high a temperature and the consequent spoiling of the substance to be dried, the containers are heat-insulated from the heat-conducting parts of the apparatus.

When most of the water has been driven off, the drying-process is discontinued and the dried product is then stored in bags or jars in a comparatively dry place. When the food is to be prepared for consumption, all that is necessary is to mix it with water and heat it to the desired temperature, whereupon the soup is ready to be eaten. Its taste and other characteristics are in the main the same as those of the soup originally cooked. As a result of the very short drying-process which is made possible by the above-mentioned method of evaporation in vacuo, the vitamines and other valuble constituents of the food are retained, while bacteria of putrefaction and the like are prevented from developing.

Other foods can be prepared in a similar manner, for example, brown beans and pork, steak and potatoes, meat-soup, pan-cakes or Yorkshire-pudding, etc.

The number of calories available per kilogram of a dish prepared according to the present invention is many times greater than those per kilogram of tinned food.

The present application is a continuation-in-part of my prior copending application, Serial Number 197,485, filed March 22, 1938, now Patent No. 2,156,845. In this prior application a process is described wherein various food substances, such as vegetables, berries, fish, eggs, milk etc. are desiccated by being subjected to a vacuum while heated by substantially exclusively radiant heat, the food substances being supported on trays which are heat insulated from the vacuum apparatus during the process. The claim in this prior case is limited to the apparatus used in the described process. In the present application the claim is drawn to the process of desiccating prepared dishes of food by the same general method and with the use of the same apparatus.

I claim:

A method for the production of cooked foods of combined vegetable and animal origin in a dried and easily transportable form, comprising preparing the food by cooking several ingredients together in water, spreading the food out in a closed chamber, the food being heat-insulated from the heat-conducting parts of the chamber, evacuating said chamber and heating the food by practically exclusively radiant heat of short wave length, the source of which is situated above and below the food and which is heated to temperatures above 200° C. whereby the greatest part of the water from the food is evaporated.

JOHAN GEORG WILHELM GENTELE.